US009947943B2

United States Patent
Bodèn et al.

(10) Patent No.: US 9,947,943 B2
(45) Date of Patent: Apr. 17, 2018

(54) FLOW FIELD PLATE FOR A FUEL CELL (75) Inventors: Andreas Bodèn, Gothenburg (SE);
Thomas Tingelöf, Gothenburg (SE);
Axel Baumann Ofstad, Västra
Frölunda (SE); Jari Ihonen, Espoo
(FI); Anders Tenstam, Öjersjö (SE)

(73) Assignee: POWERCELL SWEDEN AB,
Göteborg (SE)

( * ) Notice: Subject to any disclaimer, the term of this patent is extended or adjusted under 35 U.S.C. 154(b) by 418 days.

(21) Appl. No.: 14/410,089

(22) PCT Filed: Jun. 26, 2012

(86) PCT No.: PCT/IB2012/053229
§ 371 (c)(1),
(2), (4) Date: Dec. 23, 2014

(87) PCT Pub. No.: WO2014/001842
PCT Pub. Date: Jan. 3, 2014

(65) Prior Publication Data
US 2015/0380745 A1 Dec. 31, 2015

(51) Int. Cl.
*H01M 8/0267* (2016.01)
*H01M 8/241* (2016.01)
(Continued)

(52) U.S. Cl.
CPC ....... *H01M 8/0267* (2013.01); *H01M 8/0258* (2013.01); *H01M 8/04074* (2013.01); *H01M 8/241* (2013.01); *H01M 2008/1095* (2013.01)

(58) Field of Classification Search
CPC ............. H01M 8/0267; H01M 8/0258; H01M 2008/1095
See application file for complete search history.

(56) References Cited

U.S. PATENT DOCUMENTS 7,531,264 B2 * 5/2009 Bai .................... H01M 8/0258
429/415
2003/0186106 A1 10/2003 Frank et al.
(Continued)

FOREIGN PATENT DOCUMENTS

CN            101764240 A1    6/2010
DE     10 2008 056900 A1     5/2010
(Continued)

OTHER PUBLICATIONS

International Search Report (Mar. 18, 2013) for corresponding International Application PCT/IB2012/053229.
(Continued)

*Primary Examiner* — Ula C Ruddock
*Assistant Examiner* — Thomas H. Parsons
(74) *Attorney, Agent, or Firm* — WRB-IP LLP (57) ABSTRACT A flow field plate for a bipolar plate or bipolar plate assembly of a fuel cell or a fuel cell stack has an electrode facing front side, a backside and at least a cooling fluid manifold for supplying cooling fluid to the flow field plate. The backside includes a cooling fluid flow field for substantially uniformly distributing the cooling fluid over the flow field plate. The flow field plate further includes a cooling fluid sub-manifold which is adapted to provide cooling fluid from the cooling fluid manifold to a cooling fluid flow field. The cooling fluid sub-manifold is fluidly disconnected from the cooling fluid flow field, a bipolar plate or bipolar plate assembly including a flow field plate, as well as a fuel cell or fuel cell stack including such a flow field plate and/or bipolar plate or such a bipolar plate assembly.

20 Claims, 3 Drawing Sheets

(51) Int. Cl.
    *H01M 8/0258*     (2016.01)
    *H01M 8/04007*     (2016.01)
    *H01M 8/1018*     (2016.01)

(56) References Cited

U.S. PATENT DOCUMENTS

| | | |
|---|---|---|
| 2005/0153184 A1 | 7/2005 | Beutel et al. |
| 2008/0113254 A1* | 5/2008 | Christie ............. H01M 8/0258 429/444 |
| 2010/0028742 A1 | 2/2010 | Jeon et al. |

FOREIGN PATENT DOCUMENTS

| | | |
|---|---|---|
| JP | 2005183304 | 7/2005 |
| WO | 2010054744 A1 | 5/2010 |

OTHER PUBLICATIONS

Korean Official Action (translation) (dated May 25, 2017) for corresponding Korean App. 10-2015-7000904.
Chinese Official Action (translation) (dated Jun. 22, 2016) for corresponding Chinese App. 201280074325.3.

\* cited by examiner

FLOW FIELD PLATE FOR A FUEL CELL

BACKGROUND AND SUMMARY

The present invention relates to a flow field plate, particularly for a bipolar plate of a fuel cell or a fuel cell stack, a bipolar plate assembly for a fuel cell and a fuel cell or fuel cell stack comprising such a flow field plate and/or such a bipolar plate or bipolar plate assembly.

Usually fuel cells are arranged in fuel cell stacks which are built by stacking a plurality of repeating unit fuel cells between two end assembly units, which hold the stacked cells together. In the fuel cell stack there are features for distributing various fluids (reactants, cooling fluid) over the fuel cell stack. The features are called manifolds and flow fields. The features conducting fresh reactants and fresh cooling fluid are called inlet manifolds and the features removing unused reactants and products as well as outgoing cooling fluids are called outlet manifolds. For distributing the various fluids over active areas in the fuel cell, flow fields are used which often comprise channel-like structures. The active area of a fuel cell is defined as the area where the reactions take place.

The fuel cell stack further includes an oxidant inlet for supplying an oxidant, preferably air, to the fuel cell cathodes and a fuel inlet for supplying fuel, preferably a hydrogen containing fluid, to the fuel cell anodes and a cooling fluid inlet for supplying a cooling fluid to the cooling fluid channels. The fuel cell stack is normally operated within a specified temperature interval to maximize efficiency and/or durability.

The repeating fuel cell units comprise usually two sub-assemblies, namely a 5-layer-membrane-electrode-assembly (5-layer MEA) and a bipolar plate assembly. The 5-layer MEA comprises a membrane with two electrodes placed on the two major surfaces of the membrane, a porous anode electrode on the anode side and a porous cathode electrode on the cathode side. On each electrode, the anode and the cathode, a was diffusion layer, preferably made from a porous and electrically conductive material, is applied for conducting electricity and thermal heat to and from the electrodes as well as supplying reactants to and removing products from the electrodes. Besides the 5-layer MEA and the bipolar plate assembly further features may be present, e.g. at least a sealing layer which is adapted to seal the 5-layer MEA and the bipolar plate assembly.

The bipolar plate assembly comprises at least one flow field plate on which channel-like structures are formed which create flow paths for leading reactants from inlet manifolds to an active area of the fuel cell and unused reactants and products from the active area to the outlet manifold. The bipolar plate assembly further comprises a cooling fluid inlet manifold and a cooling fluid flow field for supplying and distributing cooling fluid to the fuel cell. The heated cooling fluid is subsequently removed by a cooling fluid outlet manifold.

For the distribution of the cooling fluid in an effective way, it is known from the state of the art, e.g. from PCT Application WO 2010/054744, to use flow field plates, which are placed adjacent to each other and are adapted to form a space between them for the distribution of the cooling fluid and to form a bipolar plate assembly. On the both sides of each flow field plate, flow field structures are arranged which are adapted to form fluid channels when the two fluid flow plates are placed in contact with each other or when the flow field plates are placed in contact with the gas diffusion layers of the respective 5-layer membrane electrode assembly. The channels between the two flow field plates are used for distributing a cooling fluid to the fuel cell stack for controlling the temperature of the fuel cell, wherein the channels on the electrode facing sides are used for distributing reactants.

Additionally, document WO 2010/054744 discloses that cooling fluid channels are arranged as a negative structure of the reactant channels and are also already present at the reactant inlet manifold. Thereby, it is alleged that the reactants are already influenced by the cooling fluid at their inlet manifold, which enables a better cooling of the reactants.

Disadvantageously, the cooling provided b the simple prolongation of the cooling channels is not sufficient for controlling the temperature during situations, where the anode gas and the cathode gas are significantly cooler or hotter than a specified temperature range. This deviation in temperature can, if not carefully controlled by additional components, be a problem for the fuel cell stack. Moreover, insufficient cooling may result in the generation of hot spots in the fuel cell, which in turn may result in an operation failure of the fuel cell stack. Consequently, even with the suggested design of WO 2010/054744, additional heat exchangers are necessary for controlling the temperatures of the reactants.

It is therefore desirable to provide an effective temperature control for a fuel cell, which allows for an omission of additional heat exchangers.

The invention, according to an aspect thereof, is based on the idea to provide a flow field plate for a bipolar plate or a bipolar plate assembly of a fuel cell or a fuel cell stack having an electrode facing front side and a backside, wherein the flow field plate comprises at least a cooling fluid manifold for supplying cooling fluid to the flow field plate and on its backside a cooling fluid flow field for substantially uniformly distributing the cooling fluid over the backside of the flow field plate, wherein the flow field plate further comprises a cooling fluid sub-manifold, which is adapted to provide cooling fluid from the cooling fluid manifold to a cooling fluid flow field, inventively, the cooling fluid sub-manifold is fluidly disconnected from the cooling fluid flow field of the own flow field plate.

That means the cooling fluid supplied to the cooling fluid sub-manifold of the flow field plate does nor supply cooling fluid to the own fluid flow field, but to a fluid flow field of another flow field plate which is adapted to be placed adjacent to the flow field plate. This design allows for an increased size and volume of the cooling fluid sub-manifold instead of the limited volume of the known channels structure so that an efficient cooling may be provided. Thereby the volume of a sub-manifold is defined by the length, width and depth of the sub-manifold, which is preferably designed as continuous space or recess in the flow field plate.

Preferably, the flow field plate further comprises on its electrode front side a reactant fluid flow field, which is preferably designed as a negative structure of the cooling fluid flow field. Forming the fluid flow fields as negative structure allows for a reduced thickness of the flow field plate, which in turn results in a desired reduced size of the fuel cell stack.

Advantageously, the flow field plate may further comprise at least a first reactant fluid manifold, which is fluidly connected to the reactant fluid flow field on the electrode facing surface of the flow field plate and a second reactant fluid manifold, which is fluidly disconnected from the reactant fluid flow field. When placing the flow field plates adjacent to each other, this arrangement of reactant manifolds allow for a distribution of the first reactant over the own fluid flow plate and of the second reactant over the adjacently placed fluid flow plate.

Having in mind this arrangement of reactant manifolds, it is clear that the cooling fluid of the cooling, fluid sub-manifold is in fact enabled to cool the reactant fluids of the adjacently placed flow field plate before the reactants enter the actual reactant flow field and thereby the active area of the fuel cell, it goes without saying, that it is also possible to heat the reactant fluids, provided the temperature of the cooling fluid is above the temperature of the reactant fluid. With other words, if the flow field plate is used as anode plate, the cooling fluid sub-manifold of the anode flow field plate is adapted to cool the oxidant, preferably air, supplied to the cathode flow field plate. Vice versa, the cooling fluid sub-manifold of the cathode plate is adapted to cool the fuel, namely the hydrogen containing gas, supplied to the anode flow field plate. Preferably, the cooling fluid sub-manifold provides a volume, which may be filled with enough cooling fluid for providing the desired heat exchanging capacity, which is necessary for controlling a temperature of the fuel cell even during situations, where the temperature of the reactants is outside the operation temperature range of the fuel cell, as mentioned above. In the following this situation is described as temperature critical situation.

According to a further preferred embodiment, the cooling fluid sub-manifold is arranged between a second reactant manifold and the cooling fluid flow field. Consequently, the cooling fluid sub-manifold is adapted to provide an increased and sufficient cooling/heating of the reactant.

According to a further preferred embodiment, a length of the cooling fluid sub-manifold substantially extends at least over the width of the second reactant sub-manifold. Thereby, the complete reactant sub-manifold may be temperature-influenced by the cooling fluid.

It is further preferred, that a cross-section of the cooling, fluid sub-manifold is reduced in size along a cooling fluid flow direction of the cooling fluid sub-manifold. By this design it is ensured that the cooling fluid is distributed uniformly to each structure of the cooling fluid flow field. Preferably, the cross-section is reduced by about 10% to 90%, preferably by 20% to 80% and most preferred by 50% to 75%.

Consequently, a preferred shape of the cooling fluid sub-manifold is a tapered shape, e.g. the cooling fluid sub-manifold is wedge-shaped or boomerang-shaped. Boomerang-shaped in this connection means an angled wedge-shaped form. With this inventive design of the cooling fluid sub-manifold, a spread in the flow velocity between the individual fluid distribution structures, e.g. the channel-like structures or the channels, may be minimized. Preferably, the flow velocity does not vary more than approximately 25%, preferably approximately less than 20% over the flow field plate.

As mentioned above, it is preferred to adapt the volume, i.e. the length, width and depth, of the cooling fluid sub-manifold so as w provide a desired heat exchanging capacity for the reactant supplied by the second reactant manifold, i.e. of the reactant streaming through the flow field structure of the respective other flow field plate, which preferably allows for an increase/decrease in temperature up to 200° C., preferably in a range of about 20° C. to 120° C., most preferred of approximately 40° C., provided there is no phase transition in the fluid.

According to a further preferred embodiment, the cooling fluid sub-manifold further comprises at least one guiding structure for guiding the cooling, fluid in the cooling fluid sub-manifold. The guiding structures may be elongated lands which are adapted to direct the cooling fluid over the whole length of the cooling fluid sub-manifold and guide approximately the same amount of cooling fluid to each channel-like flow field structure. The guiding structure may be further used as support structure for keeping two adjacent plates in substantially the same distance from each other.

According to a further preferred embodiment, the flow field plate further comprises on its backside a first reactant sub-manifold which is fluidly connected to the first reactant manifold and to the reactant fluid flow field on the front side of the flow field plate, preferably by tunnel like openings in the flow field plate. This arrangement allows for a uniform distribution of the reactant over the flow field plate.

Advantageously, the first reactant fluid manifold and/or the first reactant sub-manifold, and the second reactant fluid manifold and/or the second reactant sub-manifold exhibit a substantially axial symmetric size and/or substantially axial symmetric shape. Moreover, the flow field plate may exhibit a substantially rotational symmetry, preferably concerning its centre of mass.

Since the fuel flow is usually smaller than the oxidant now, it may be advantageous to design flow field plates having an asymmetrical shape, where the fuel manifolds are smaller than the oxidant manifolds. Moreover, also the fuel flow field may be designed differently from the oxidant flow field, which results in a different design for a flow field plate used as anode plate and a flow field plate used as cathode plate. For example, the fuel flow field of the anode plate may have fewer channel-like structures and/or the fuel channel-like structures may have a reduced cross-section. Advantageously, adapting the fuel flow field plate to the reduced fuel flow allows for smaller flow field plates, which in turn reduces the overall size of the fuel cell stack. Additionally, the smaller cross-section of the channel-like structures in the fuel flow field and/or the fewer fuel channel-like structures increase the fuel flow velocity to the same level as at the oxidant flow velocity, so that water droplets may be efficiently removed.

However, even if there are good reasons for an asymmetrical shape, the inventors have inventively discovered that using a symmetrical flow field plate allows for a more evenly distributed clamping force applied to each flow field plate and consequently to the fuel cell stack. Besides that, a symmetrical design allows for flipping the operation direction of the fuel cell, i.e. changing inlet and outlet, in order to increase the fuel cell's lifetime. This is due to the fact that usually the fuel cell is more worn at the inlet side than at the outlet side due to temperature differences and/or the dry gas.

Additionally, the tooling costs, the logistic costs and the storage costs may be reduced as only one tool for producing flow field plates is necessary and only one kind of flow field plates need to be handled and held on stock. It should be also noted that since the tool produces substantially identical flow field plates, the quality of a bipolar plate assembly is increased.

According to a further aspect of the invention, a bipolar plate assembly is provided which comprises at least a first flow field plate as mentioned above and a second flow field plate as mentioned above, wherein preferably the first and the second flow field plates are adapted to be arranged in contact to each other. It goes without saying that the invention may also be used for bipolar plates having flow field plates, which are separated by a further plate or layer.

The cooling fluid sub-manifolds and the cooling, fluid flow fields of the first and the second flow field plates are adapted to form channel-like cooling structures for the cooling fluid. Inventively, the cooling fluid sub-manifold of the first flow field plate is adapted to be fluidly connected to the cooling fluid flow field of the second flow field plate and the cooling fluid sub-manifold of the second flow field plate is adapted to be fluidly connected to the cooling fluid flow field of the first flow field plate when the first and the second flow field plates are placed in contact with each other or contact an intermediate layer. As mentioned above, this design allows that the cooling fluid sub-manifold may extend over the whole area of the respective other reactant sub-manifold which in turn enables a sufficient cooling of the respective reactants even during the above mentioned temperature critical conditions.

Preferably, the first fluid flow plate is designed as cathode plate and the second fluid flow plate is designed as anode plate, wherein preferably the cathode plate has an oxidant manifold as first reactant fluid manifold, an optional oxidant sub-manifold and/or an optional fuel sub-manifold, a fuel manifold as second fluid manifold, and an oxidant flow field as reactant flow field for providing, an oxidant, preferably air, to the electrode facing side of the cathode plate. Respectively, the anode plate has a fuel manifold as first reactant fluid, manifold, an optional fuel sub-manifold and/or an optional reactant sub-manifold, an oxidant manifold as second reactant manifold, and a fuel flow field as reactant flow field for providing fuel, preferably a hydrogen containing fluid, to the electrode facing side of the anode plate.

According to a further aspect of the present invention, a bipolar plate assembly of a fuel cell or a fuel cell stack is provided, having a cathode plate with an oxidant flow field on a cathode facing front side and a cooling fluid flow field on a backside, and an anode plate with a fuel flow field on an anode facing front side and a cooling, fluid flow field on a backside. The cathode plate and the anode plate may further comprise at least a cooling fluid manifold for supplying cooling fluid to the bipolar plate and a cooling fluid sub-manifold for distributing the cooling fluid to the cooling fluid flow field, an oxidant manifold for providing oxidant, preferably air, to the bipolar plate assembly and an oxidant sub-manifold for distributing the oxidant to the oxidant flow field, and a fuel manifold for providing fuel, preferably a hydrogen containing fluid, to the bipolar plate assembly and a fuel sub-manifold for distributing fuel to the fuel flow field. Inventively, the cooling fluid sub-manifold of the anode plate is designed as space extending substantially over a length of the oxidant sub-manifold the cooling fluid sub-manifold of the cathode plate is designed as space extending substantially over a length of the fuel sub-manifold. Thereby, the volume of the cooling fluid sub-manifold of the anode plate is adapted to provide a heat exchanging capacity for the oxidant, preferably to the oxidant streaming through the oxidant sub-manifold and/or the oxidant flow field. Analogously, the volume of the cooling fluid sub-manifold of the cathode plate is adapted to provide a heat exchanging capacity for the fuel, preferably for the fuel streaming through the fuel sub-manifold and/or the fuel sub-manifold. Since, as mentioned above the cooling fluid sub-manifold may be designed as space extending over the respective reactant (sub-)manifold of the respective other plate, the heat exchanging capacity may be adapted so that further temperature controlling devices, particularly heat exchangers, for the reactants may be omitted. Thereby, it should be noted that the heat exchanging influence of the cooling fluid sub-manifold is not at the active area of the flow field plate, but at the reactant sub-manifold upstream of the active area. As mentioned above, the reactant sub-manifold is adapted to distribute the reactant to the corresponding flow field from which is adapted to guide the reactant to the active area of the fuel cell.

As mentioned above, the cooling fluid sub-manifold of the cathode plate is preferably adapted to be fluidly connected to the cooling fluid flow field of the anode plate and the cooling fluid sub-manifold of the anode plate is adapted to be fluidly connected to the cooling fluid flow field of the cathode plate, preferably when the cathode plate and the anode plate are placed in contact with each other or contact the intermediate layer. Thereby, the above mentioned volume for the cooling fluid sub-manifold may be provided.

According to a further preferred embodiment, the bipolar plate assembly is shaped asymmetrically, wherein the fuel manifold is smaller than the oxidant manifold and/or wherein the cooling fluid sub-manifold of the anode plate is larger than the cooling fluid sub-manifold of the cathode plate), and/or wherein the oxidant flow field of the cathode plate comprises more channel-like structures than the fuel flow field of the anode plate, and/or wherein a cross-section of the channel-like structures of the fuel flow field of the anode plate is smaller than a cross-section of the channel-like structures of the oxidant flow field of the cathode plate. Thereby, a bipolar plate assembly comprising the above mentioned advantages for an asymmetric flow field plate may be achieved.

According to a further preferred embodiment, the bipolar plate assembly is designed symmetrically, wherein the fuel manifold and/or the fuel sub-manifold and/or the fuel flow field is substantially equal sized to the oxidant manifold and/or the oxidant sub-manifold and/or the oxidant flow field, and/or wherein the cooling fluid sub-manifold of the anode plate is substantially equal sized to the cooling fluid sub-manifold of the cathode plate. Thereby, a bipolar plate having the above mentioned advantages of a symmetric flow field plate is achieved.

According to a further aspect of the invention, a fuel cell and/or a fuel cell stack having at least one flow field plate as mentioned above and/or having at least one bipolar plate and/or a bipolar plate assembly as mentioned above is disclosed.

Further advantages and/or preferred embodiments are described in the description, the Figures and the attached claims.

BRIEF DESCRIPTION OF THE DRAWINGS

In the following the invention will be described in greater detail with reference to the attached Figures. Thereby, it should be explicitly noted that the embodiments shown m the Figures shall not be intended to limit the scope of the invention. The scope of the invention is solely determined by the attached claims.

The Figures show:

FIG. 3: an enlarged schematic view of the oxidant manifold and oxidant sub-manifold of the preferred embodiment shown in FIG. 1
  a) from the backside and
  b) from the front side:

DETAILED DESCRIPTION

In the following same or similarly acting elements are indicated by the same reference numerals.

In general, a fuel cell stack is built by stacking a plurality of repeating fuel cell units between two end assembly units that hold the stacked cells together. The repeating fuel cell units comprise mainly two sub-assemblies, namely a 5-layer membrane electrode assembly (5-layer MEA) and a bipolar plate assembly. Optionally, a sealing layer may be arranged between the 5-layer MEA and the bipolar plate assembly sealing both main components. The sealing layer may also be an integral part of the 5-layer MEA and/or of the bipolar plate assembly.

The 5-layer MEA comprises a membrane electrode assembly covered on both sides by a gas diffusion layer. The membrane electrode assembly itself comprises a membrane with two electrodes, an anode and a cathode, placed on the two major surfaces of the membrane. The anode (electrode) and the cathode (electrode) are covered by the gas diffusion layers, which are usually made from a porous and electrically conducting material and are adapted to conduct electricity and thermal heat to and from the electrodes as well as to supply the reactants to and to remove products from the electrodes. The electrodes, the membrane and the gas diffusion layers form the 5-layer membrane electrode assembly (5-layer MEA).

In a fuel cell stack, a bipolar plate or a bipolar plate assembly separates two of the above described 5-layer MEAs. Thereby, the bipolar plate has an anode facing side and a cathode facing side. The anode facing side is placed in contact with the gas diffusion on layer covering the anode of the first 5-layer MEA, and the cathode facing side is placed in contact with the gas diffusion layer covering, the cathode of the second 5-layer MEA.

The bipolar plate or bipolar plate assembly itself may comprise a single plate or two and more plates which are placed in contact with each other. On the electrode facing sides of the bipolar plate, channel-like fluid distribution structures are arranged which form channels or channel-like structures for the reactants, when placed in contact with the respective gas diffusion layers. The channel-like flow field structures on the electrode sides of the bipolar plate/the bipolar plate assembly ensure a uniform distribution of the reactants to the active areas of the electrodes.

A bipolar plate assembly usually comprises at least two flow field plates, an anode flow field plate facing the anode side of the first 5-layer MEA and the cathode flow field plate facing the cathode of the second 5-layer MEA.

Usually, the bipolar plate and/or the flow field plates are made from a material with good electrical and thermal conduction properties with no or negligible permeability of gases or liquids. Additionally, the plates may be coated with a material having good electrical and thermal conduction properties for further improving the electrical and thermal conductivity. As mentioned above, channel-like structures or channels are formed in the bipolar plate or the flow field plates to create flow paths for leading reactants from a reactant inlet manifold to the active area and unused reactants and product water from the active area to the reactant outlet manifold.

In the bipolar plate assembly comprising at least two flow field plates a region for distributing cooling fluid for removal of the produced heat is created when the two flow field plates are placed in contact with each other. For the distribution of the cooling fluid, the flow field plates usually comprise on their backsides a cooling fluid flow field comprising channel-like structures for uniformly distributing the cooling fluid over the flow field plate.

Figure 1:
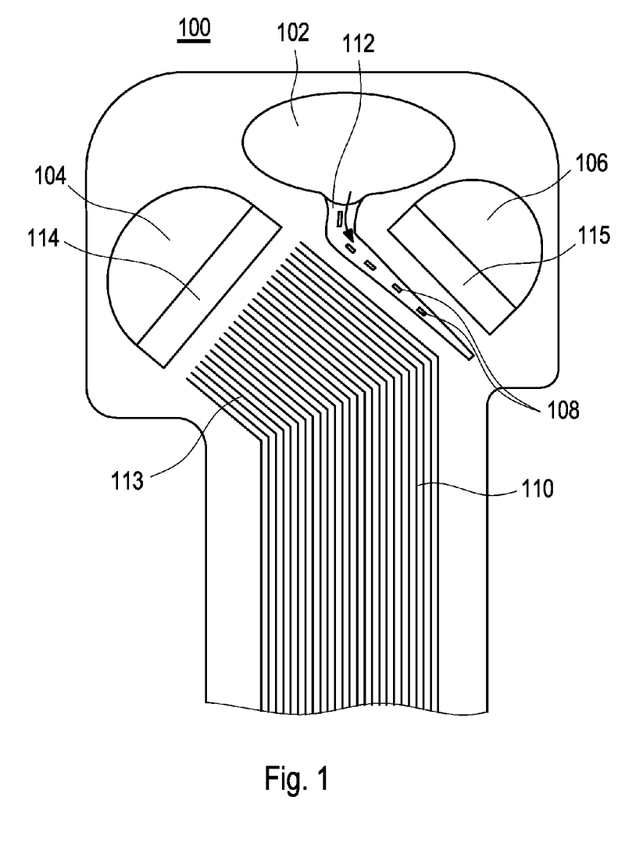
FIG. 1: a schematic view of a preferred embodiment for an inventive flow field plate designed as cathode plate.
Figure 2:
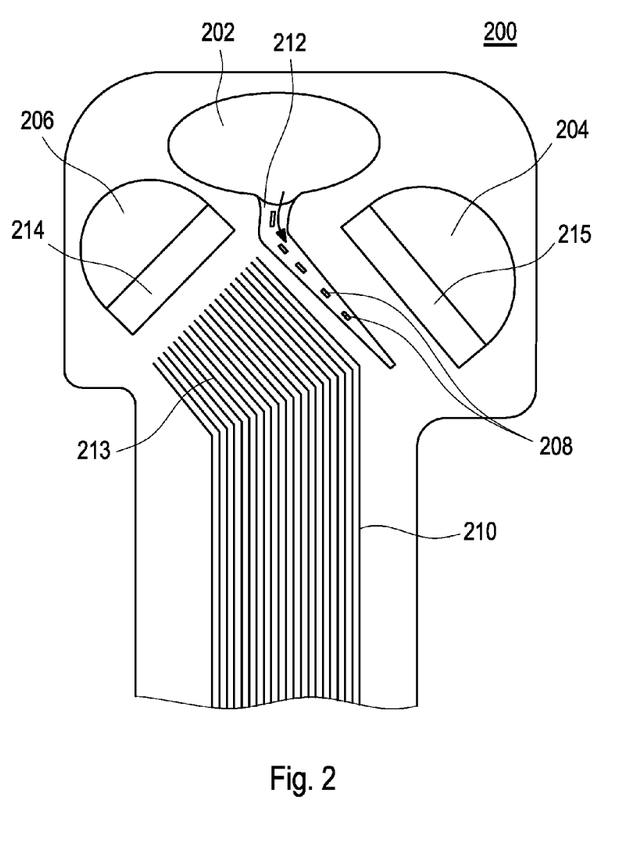
FIG. 2: a schematic view of a preferred embodiment for an inventive flow field plate designed as anode plate.

FIG. 1 and FIG. 2 depict schematically the backsides of a cathode flow field plate 100 (FIG. 1) and art anode flow field plate 200 (FIG. 2).

The cathode flow field plate (cathode plate) 100 and the anode flow field plate (anode plate) 200 both comprise a cooling fluid inlet manifold 102, 202 and an oxidant inlet manifold 104, 204 as well as a fuel inlet manifold 106 and 206. When the backsides of both flow field plates 100, 200 are placed in contact with each other, the inlet manifolds 102, 202, 104, 204, and 106 and 206 are forming respective common manifolds. On the backside of the flow field plates 100, 200 cooling fluid flow fields 110, 210 are formed. The cooling fluid flow fields 110, 240 comprise channel-like structures 111, 211 for distributing the cooling fluid uniformly over the flow field plates and thereby over the active area of the fuel cell.

The Figures further depict an oxidant sub-manifold 114 at the cathode plate 100 and fuel sub-manifold 214 at the anode plate 200. It should be noted that it is also possible that the fuel sub-manifold 214 may only be formed in the cathode plate 100 and/or the oxidant sub-manifold 114 may be only formed in the anode plate. On the other hand, it is also possible that each flow field plate, the cathode plate and the anode plate, comprise both an oxidant sub-manifold 114, 215 and a fuel sub-manifold 214, 115. It goes without saying that also an asymmetrical design is possible, where the oxidant sub-manifold 114,215 is formed in both flow field plates, but the fuel sub-manifold 214 is only formed in one of the flow field plates or vice versa.

As depicted in FIG. 1, the cathode plate 100 further comprises a cooling fluid sub-manifold 112 which extends along the whole length of the fuel sub-manifold 214 (see FIG. 2). Further, the cooling fluid sub-manifold 112 is adapted to be fluidly connected to the flow field 210 of the anode plate 200 in an area indicated with reference numeral 213.

Analogously, the anode plate 200 has a cooling fluid sub-manifold 212 which extends along the whole length of the oxidant sub-manifold 114 and is adapted to connect the cooling fluid flow field 110 of the cathode plate 100 in an area which is indicated by reference numeral 113.

For guiding the cooling fluid in the cooling fluid sub-manifold 112, 212 guiding structures 108, 208 may be provided which are designed in the embodiment of FIGS. 1 and 2 as elongated lands. Besides guiding the cooling fluid in the cooling fluid sub-manifold 112, 212, the guiding structures 108, 208 may provide a support for the respective other flow field plate when the flow field plates are placed in contact with each other. It goes without saying that, besides the illustrated design of the guiding structures, the guiding structures may have any other shape, which is adapted to provide at least one of the above mentioned features.

Aside from the distribution of the cooling fluid to the cooling fluid flow field 110, 210, the cooling fluid sub-manifold 112, 212 is further adapted to cool or heat the respective reactant of the other flow field plate 200, 100, thereby providing a temperature control for the fuel cell. That means the cooling fluid sub-manifold 112 of the cathode plate 100 is adapted to control the temperature of the fuel streaming from fuel manifold 106 to fuel sub-manifold 214 and further to the anode side of the anode plate 200. This in turn means that the temperature of the fuel is controlled before the fuel is guided to the active area of the fuel cell. The same applies for the cooling fluid sub-manifold 212 on the anode plate 200, which is adapted to control the temperature of the oxidant streaming from oxidant manifold 204 to oxidant sub-manifold 114 and further to the cathode side of the cathode plate 100. Consequently, also the temperature of the oxidant is controlled before the oxidant is guided to the active area of the fuel cell.

Figure 3:
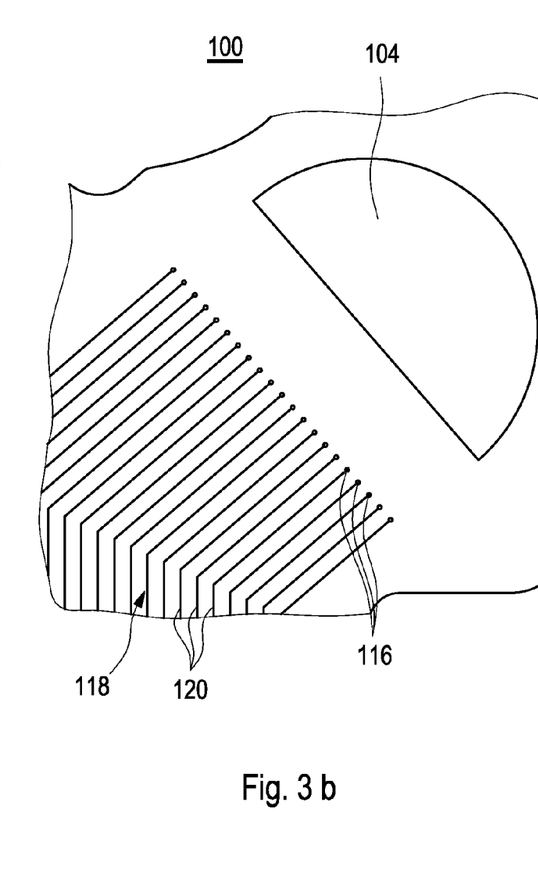

FIG. 3 depicts the backside (FIG. 3a) and the front side (FIG. 3b) of a cathode plate 100 in enlarged detail. Thereby, FIG. 3a shows the backside of the cathode plate 100 with oxidant manifold 104 and cathode sub-manifold 114. As can be seen in FIG. 3a the oxidant sub-manifold 114 further comprises a plurality of tunnel-like openings 116 which extend to the front side of the cathode plate 100 (see FIG. 3b). The tunnel-like openings 116 are adapted to guide the oxidant entering the backside of the cathode plate 100 at oxidant sub-manifold 114 to the front side and further to at oxidant flow field 118 comprising channel-like structures 120, which form oxidant flow channels, when the cathode plate is placed in contact with the gas diffusion layer of the cathode side of the 5-layer MEA. The oxidant fluid flow field 118 and the cooling fluid flow field 110 are preferably designed as negatives of each other.

Even if not illustrated by a figure, the anode plate 200 may analogously comprise tunnel-like openings, which are adapted to guide fuel entering the backside of the anode plate 200 at fuel sub-manifold 214 to the anode facing side and further to channel-like structures of a fuel flow field.

By designing the cooling fluid flow fields 110, 210 as negatives of the respective reactant flow field 118, it is ensured that the flow field plate 100, 200 may be made very thin which in turn decreases the overall size of the fuel cell stack.

As further depicted in FIGS. 1 and 2 the cooling fluid sub-manifold 112, 212 provides a decreasing cross-section in direction of the flow direction of the cooling fluid in the cooling fluid sub-manifold 112, 212 (see arrow). The reduction in the cross-section ensures a uniform flow distribution over the coolant fluid flow fields 110, 210. Preferably, the reduction is of approximately 10% to 90%, preferably 20% to 80% and most preferred 50% to 75%. Additionally, the reduced cross-section facilitates a more compact design of the cooling fluid manifold and the reactant manifold area of the bipolar plates. Advantageously, the total volume of the cooling fluid sub-manifold is adapted so that the heat exchanging capacity is sufficiently large for influencing the reactants. Preferably, the volume is adapted so that the reactants may be cooled or heated approximately for up to 200° C. preferably in a range of about 20° C. to 120° C., most preferred of approximately 40° C., provided there is no phase transition in the fluid.

As can be seen, the cooling fluid sub-manifolds 112, 212 of FIG. 1 and FIG. 2 have a different length in the depicted embodiments. Since the fuel flow is usually smaller than the oxidant flow, the fuel inlet manifold 106, 206 may be made smaller than the oxidant inlet manifold 104, 204. This is particularly useful when fuel cells are used which operate on pure hydrogen which has a low viscosity. Even with the smaller fuel inlet manifold 106, 206 the pressure drop is not increased. Additional a smaller fuel manifold 106, 206 allows for a smaller overall size of the flow field plate 100, 200 which results in a more compact design.

Additionally, since the flow at the anode side is usually smaller than the flow at the cathode side, the flow fields are ordinarily designed thereto. For example, the anode plate 200 may have fewer channel-like structures, or the cross-sections of the channel-like structures are adapted to the expected fuel flow in order to increase the fuel flow velocity to approximately the same level as the oxidant flow velocity so that water droplets are efficiently removed.

Figure 4:
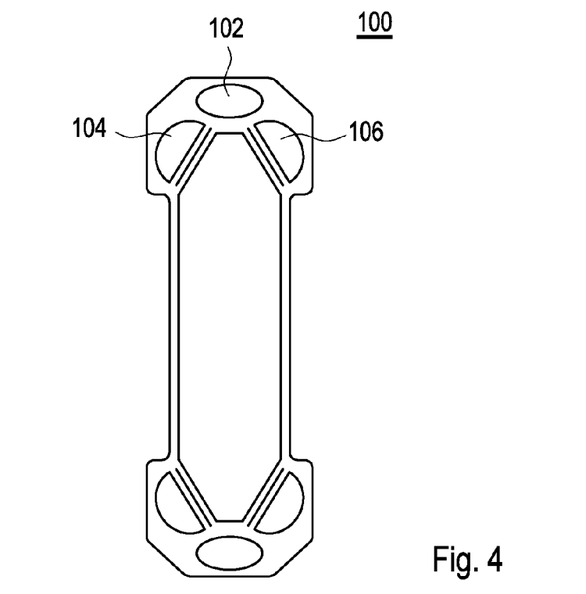
FIG. 4: a schematic, view of a further preferred embodiment for an inventive flow field plate.

Besides the depicted designs in FIGS. 1, 2 and 3 it is also possible to design the cathode and anode plates 100, 200 symmetrically. The cathode manifold 104 and 204 and the anode manifold 106 and 206 and the respective sub-manifolds 114, 214 are then substantially equally sized. In this embodiment also the cooling fluid sub-manifolds 112 and 212 are substantially equally sized. A symmetrical flow field plate is schematically depicted in FIG. 4.

The symmetrical design of the flow field plates 100, 200 has the advantage that tooling, costs or manufacturing costs are reduced since both plates may be tooled on the same stamping tool. Thereby, also flow field plates having a higher quality may be produced as the flow field plates are substantially identical. Further, having symmetrically designed flow field plates enables for a more evenly distributed clamping pressure on the bipolar plates. Additionally, the symmetrical design enables for an increase in lifetime off the fuel cell stack, since the operation direction of the fuel cell stack may be reversed after a predetermined operation period. Usually, the fuel cell is more worn at the inlet side than at the outlet side due to temperature differences and/or the dry gas. By reversing the operation direction after a certain operation time the wear may be distributed more evenly to all parts of the fuel cell.

Regardless whether the anode plate and the cathode plate 100, 200 are designed symmetrically or asymmetrically, the length of the coolant fluid sub-manifolds 112, 212 is preferably greater or equal to the reactant sub-manifolds 114, 214, respectively. Thereby, areas with sub-optimal cooling are avoided, where the temperature will increase and may lead to a failure of the fuel cell due to hot spots. Preferably, the cooling, fluid sub-manifolds 112, 212 are oriented such that the flow of the cooling fluid in the cooling fluid sub-manifold 112, 212 is substantially normal to the flow of the reactant from the reactant sub-manifold 114, 214.

Figure 5:
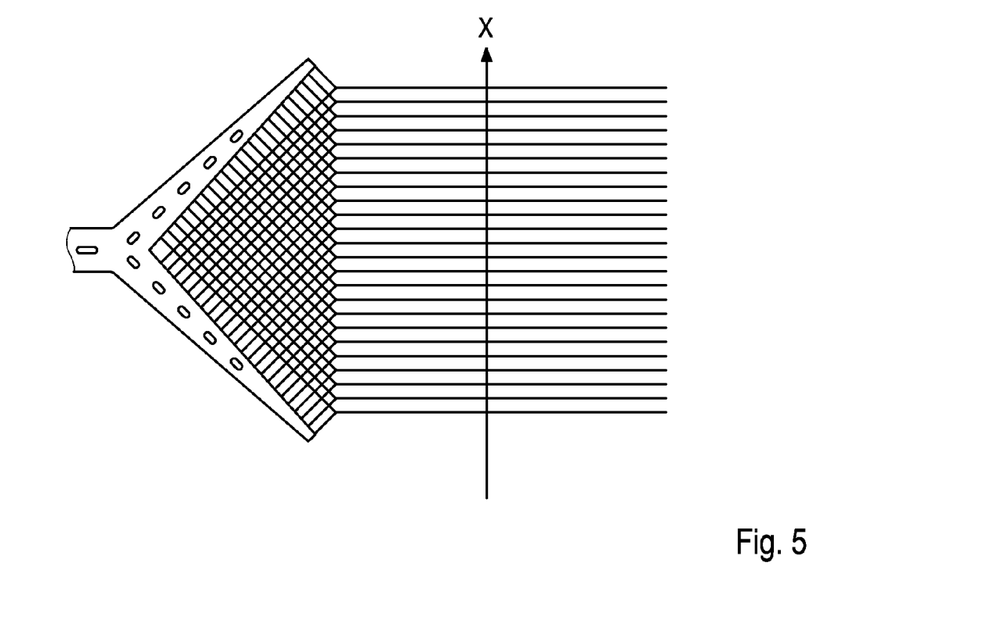
FIG. 5: a schematic view of the flow pattern created when an inventive anode flow field plate and an inventive cathode flow field plate are placed in contact.

When placing the cathode plate 100 and anode plate 200 in contact with each other, the inventive flow field structures create a flow pattern as illustrated in FIG. 5. The created flow, pattern allows for a distribution of the cooling fluid velocity between individual cooling channels over the direction x (see FIG. 5) to vary not more than approximately 20%, preferably approximately 15%, if the average velocity is in the range of approximately 0.30 m/s to 0.60 m/s preferably 0.40 m/s to 0.50 m/s. Consequently, one important feature of the design of the cooling fluid sub-manifold 112, 212 is to minimize the spread in the flow velocity between the individual flow channels of the cooling flow field. This is inventively achieved by the reduced cross-section of the cooling fluid sub-manifold 112, 212 and the optional guiding structures 108, 208. However, besides the illustrated shape, the cooling fluid sub-manifold 112, 212 may have any other shapes substantially providing at least one of the above discussed features.

Generally, with this invention the utilization of the active area of each fuel cell unit is maximized. In this invention a thin formed metal bipolar plate assembly may be created with an efficient flow distribution without the need of extra insert or an additional plate. This increases the volumetric power density of the fuel cell stack, reduces the complexity of the fuel cell stack assembly and increases its cost effectiveness. Further, the cooling fluid sub-manifold is adapted to provide a cooling and/or heating area having, a sufficient heat exchanging, capacity for the reactants, which may eliminate the need for additional heat exchangers. Thereby, the volumetric power density of the fuel cell system may be increased and the systems costs may be reduced. The invention also allows for the usage of symmetrical flow field plates, which decrease the tooling investment cost and creates a substantially even contact pressure distribution within a fuel cell stack, thereby decreasing the risk of fluid leakage.

The invention claimed is:

1. Flow field plate for a bipolar plate or bipolar plate assembly of a fuel cell or a fuel cell stack, having an electrode facing front side, a backside and at least a cooling fluid manifold configured for supplying cooling fluid to another flow field plate, wherein the backside comprises a cooling fluid flow field for substantially uniformly distributing cooling fluid over the flow field plate, the flow field plate further comprises a cooling fluid sub-manifold which is adapted to distribute cooling fluid from the cooling fluid manifold to a cooling fluid flow field of the another flow field plate, wherein the cooling fluid sub-manifold is fluidly disconnected from the cooling fluid flow field of the flow field plate.

2. Flow field plate according to claim 1, wherein the flow field plate comprises on its electrode facing front side a reactant fluid flow field, which is designed as negative structure of the cooling fluid flow field.

3. Flow field plate according to claim 1, wherein the flow field plate further comprises at least a first reactant fluid manifold which is fluidly connected to the reactant fluid flow field and a second reactant fluid manifold, which is fluidly disconnected from the reactant fluid flow field on the electrode facing surface of the flow field plate.

4. Flow field plate according to claim 3, wherein the flow field plate comprises on its backside a first reactant sub-manifold which is fluidly connected to the first reactant manifold and to the reactant fluid flow field on the electrode facing surface of the flow field plate by tunnel-like openings in the flow field plate.

5. Flow field plate according to claim 4, wherein the first reactant fluid manifold and/or the first reactant sub-manifold, and the second reactant fluid manifold and/or the second reactant sub-manifold, exhibit a substantially axial-symmetric size and/or a substantially axial-symmetric shape, and/or wherein the flow field plate exhibits a substantially rotational symmetry.

6. Flow field plate according to claim 3, wherein the cooling fluid sub-manifold is arranged in an area between the second reactant manifold and the cooling fluid flow field.

7. Flow field plate according to claim 6, wherein a length of the cooling fluid sub-manifold substantially extends at least over the length of the second reactant fluid sub-manifold.

8. Flow field plate according to claim 3, wherein length, width and depth of the cooling fluid sub-manifold are designed to provide a predetermined cooling fluid flow velocity in the cooling fluid sub-manifold and/or in the cooling fluid flow field and/or to provide a predetermined heat exchanging area between the cooling fluid and the reactant supplied by the second reactant manifold.

9. Flow field plate according to claim 1, wherein a cross-section of the cooling fluid sub-manifold is reduced along a cooling fluid flow direction in the cooling fluid sub-manifold.

10. Flow field plate according to claim 9, wherein the cross-section of the cooling fluid sub-manifold is reduced by about 10% to 90%.

11. Flow field plate according to claim 9, wherein the cooling fluid sub-manifold has a tapered shape.

12. Flow field plate according to claim 1, wherein the cooling fluid sub-manifold further comprises at least one cooling fluid guiding structure.

13. Bipolar plate assembly for a fuel cell or a fuel cell stack comprising at least a first flow field plate and a second flow field plate, each of the first and second flow field plates having an electrode facing front side, a backside and at least a cooling fluid manifold for supplying cooling fluid to the second flow field plate and the first flow field plate, respectively, wherein the backside of each of the first and second flow field plates comprises a cooling fluid flow field for substantially uniformly distributing cooling fluid over the first and second flow field plates, respectively, each of the first and second flow field plates further comprising a cooling fluid sub-manifold which is adapted to distribute cooling fluid from the cooling fluid manifold to a cooling fluid flow field, wherein, for each of the first and second flow field plates, the cooling fluid sub-manifold is fluidly disconnected from the cooling fluid flow field of the respective one of the first and second flow field plates, wherein the first and the second flow field plates are adapted to be arranged adjacent to each other, so that the cooling fluid flow fields of the first and second flow field plates are adapted to form channel-like structures for the cooling fluid, wherein the cooling fluid sub-manifold of the first flow field plate is adapted to be fluidly connected to the cooling fluid flow field of the second flow field plate and the cooling fluid sub-manifold of the second fluid flow plate is adapted to be fluidly connected to the cooling fluid flow field of the first flow field plate, when the first and the second flow field plates are placed in contact with each other.

14. Bipolar plate assembly according to claim 13, wherein the first flow field plate is designed as cathode plate and the second flow field plate is designed as anode plate, wherein the cathode plate has an oxidant manifold as first reactant fluid manifold and an oxidant flow field as reactant flow field, for providing an oxidan to the electrode facing side of the cathode plate, and/or wherein the anode plate has a fuel manifold as first reactant fluid manifold and a fuel flow field as reactant flow field, for providing fuel to the electrode facing front side of the anode plate.

15. Bipolar plate assembly according to claim 14, wherein the fuel manifold is smaller than the oxidant manifold, and/or wherein the cooling fluid sub-manifold of the anode plate is larger than the cooling fluid sub-manifold of the cathode plate, and/or wherein the oxidant flow field comprises more channel-like structures than the fuel flow field, and/or wherein a cross-section of the channel-like structures of the fuel flow field is smaller than a cross-section of the channel-like structures of the oxidant flow field.

16. Bipolar plate assembly according to claim 14 wherein the anode plate is substantially identical to the cathode plate.

17. Bipolar plate assembly according to claim 13, wherein at least one of the cathode plate and the anode plate is flow field plate, the flow field plate having an electrode facing front side, a backside and at least a cooling fluid manifold for supplying cooling fluid to the flow field plate, wherein the backside comprises a cooling fluid flow field for substantially uniformly distributing the cooling fluid over the flow field plate, the flow field plate further comprises a cooling fluid sub-manifold which is adapted to distribute cooling fluid from the cooling fluid manifold to a cooling fluid flow field, wherein the cooling fluid sub-manifold is fluidly disconnected from the cooling fluid flow field of the flow field plate.

18. Bipolar plate assembly of a fuel cell or a fuel cell stack, having a cathode plate with an oxidant flow field on a cathode facing front side and a cooling fluid flow field on a backside, and an anode plate with a fuel flow field on an anode facing front side and a cooling fluid flow field on a backside, wherein the cathode plate and the anode plate further comprise at least
- a cooling fluid manifold for supplying cooling fluid to the bipolar plate and a cooling fluid sub-manifold for distributing the cooling fluid to the cooling fluid flow field;
- an oxidant manifold for providing oxidant to the bipolar plate assembly and an oxidant sub-manifold for distributing the oxidant to the oxidant flow field, and
- a fuel manifold for providing fuel to the bipolar plate assembly and a fuel sub-manifold for distributing fuel to the fuel flow field;
- wherein the cooling fluid sub-manifold of the anode plate is designed as space extending substantially over a length of the oxidant sub-manifold and the cooling fluid sub-manifold of the cathode plate is designed as space extending substantially over a length of the fuel sub-manifold.

19. Bipolar plate assembly according to claim 18, wherein the cooling fluid sub-manifold of the cathode plate is fluidly connected to the cooling fluid flow field of the anode plate and the cooling fluid sub-manifold of the anode plate is fluidly connected to the cooling fluid flow field of the cathode plate when the cathode plate and anode plate are placed in contact with each other.

20. Fuel cell and/or fuel cell stack having at least one of a flow field plate and a bipolar plate assembly,
- the flow field plate having an electrode facing front side, a backside and at least a cooling fluid manifold for supplying cooling fluid to another flow field plate, wherein the backside comprises a cooling fluid flow field for substantially uniformly distributing cooling fluid over the flow field plate, the flow field plate further comprises a cooling fluid sub-manifold which is adapted to distribute cooling fluid from the cooling fluid manifold to a cooling fluid flow field of the another flow field plate, wherein the cooling fluid sub-manifold is fluidly disconnected from the cooling fluid flow field of the flow field plate, and
- the bipolar plate assembly for a fuel cell or a fuel cell stack comprising at least a first flow field plate and a second flow field plate, each of the first and second flow field plates having an electrode facing front side, a backside and at least a cooling fluid manifold for supplying cooling fluid to the second flow field plate and the first flow field plate, respectively, wherein the backside of each of the first and second flow field plates comprises a cooling fluid flow field for substantially uniformly distributing the cooling fluid over the first and second flow field plates, respectively, each of the first and second flow field plates a cooling fluid sub-manifold which is adapted to distribute cooling fluid from the cooling fluid manifold to a cooling fluid flow field, wherein, for each of the first and second flow field plates, the cooling fluid sub-manifold is fluidly disconnected from the cooling fluid flow field of the respective one of the first and second flow field plates, wherein the first and the second flow field plates are adapted to be arranged adjacent to each other, so that the cooling fluid flow fields of the first and second flow field plates are adapted to form channel-like structures for the cooling fluid, wherein the cooling fluid sub-manifold of the first flow field plate is adapted to be fluidly connected to the cooling fluid flow field of the second flow field plate and the cooling fluid sub-manifold of the second fluid flow plate is adapted to be fluidly connected to the cooling fluid flow field of the first flow field plate, when the first and the second flow field plates are placed in contact with each other.

* * * * *